(12) United States Patent
Yamaguchi

(10) Patent No.: US 7,911,667 B2
(45) Date of Patent: Mar. 22, 2011

(54) OPTICAL BEAM SCANNING DEVICE, IMAGE FORMING APPARATUS, OPTICAL BEAM SCANNING METHOD

(75) Inventor: Masao Yamaguchi, Shinagawa-ku (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1328 days.

(21) Appl. No.: 11/421,467

(22) Filed: May 31, 2006

(65) Prior Publication Data
US 2007/0279708 A1   Dec. 6, 2007

(51) Int. Cl.
*G02B 26/08* (2006.01)

(52) U.S. Cl. .................................................. 359/204.1

(58) Field of Classification Search ............... 359/204.1; 347/241, 243, 244
See application file for complete search history.

(56) References Cited

U.S. PATENT DOCUMENTS

| | | | |
|---|---|---|---|
| 6,717,704 B2 * | 4/2004 | Nakai | 359/204.1 |
| 6,839,076 B2 | 1/2005 | Yamaguchi | |
| 6,888,655 B2 | 5/2005 | Yamaguchi | |
| 6,980,342 B1 | 12/2005 | Yamaguchi | |
| 2003/0020801 A1 | 1/2003 | Yamaguchi | |

FOREIGN PATENT DOCUMENTS

| | | |
|---|---|---|
| JP | 2002-328323 | 11/2002 |
| JP | 2005-024958 | 1/2005 |
| JP | 2005-049506 | 2/2005 |
| JP | 2005-049509 | 2/2005 |
| JP | 2005-062399 | 3/2005 |

OTHER PUBLICATIONS

Beiser, Laser Scanning Notebook, LSN-8-11/91, The Polygon Scanner, 1992.
Beiser, Laser Scanning Notebook, Spie Optical Engineering Press, The Polygon Scanner, LSN-8-11/91.

* cited by examiner

*Primary Examiner* — Euncha P Cherry
(74) *Attorney, Agent, or Firm* — Turocy & Watson, LLP

(57) ABSTRACT

A technique is provided which can realize scanning by a light flux having a desired optical characteristic in a light beam scanning device adopting a multi-beam optical system. There are provided a pre-deflection optical system that shapes divergent light beams from plural light sources into a light flux having a cross-sectional shape long in a specified direction, and a rotary deflector that deflects the light flux shaped by the pre-deflection optical system and scans it in the specified direction, and the pre-deflection optical system includes a first optical system that weakens a degree of divergence of the divergent light beams from the plural light sources or converts them into parallel light beams or converging light beams, a second optical system including at least one lens having a negative power in a rotation axis direction of the rotary deflector, and a third optical system having a positive power in the rotation axis direction of the rotary deflector.

20 Claims, 16 Drawing Sheets

FIG. 6 (A)

1st Surface of fθ1

| CUY | CYZ | AY | AZ |
|---|---|---|---|
| 0.0190210 | -0.0147546 | 1 | 1 |

| | | | | | | m | | | | | |
|---|---|---|---|---|---|---|---|---|---|---|---|
| | | 0 | 1 | 2 | 3 | 4 | 5 | 6 | 7 | 8 | 9 | 10 |
| | 0 | 0.000E+00 | -5.075E-02 | 0.000E+00 | 3.402E-05 | -5.413E-06 | -8.876E-09 | -3.297E-10 | 3.380E-11 | -6.406E-13 | -1.116E-14 | 7.120E-16 |
| | 1 | 0.000E+00 | -5.988E-06 | 1.407E-07 | 1.467E-07 | 1.155E-08 | -6.891E-10 | 6.566E-12 | -5.297E-13 | 1.169E-14 | 5.802E-16 | -1.260E-17 |
| n | 2 | -8.696E-05 | -3.944E-06 | -4.335E-07 | 5.183E-08 | -1.916E-09 | 4.486E-11 | 3.950E-12 | -2.012E-13 | -4.174E-17 | -3.424E-16 | 1.399E-17 |
| | 3 | 1.008E-05 | 7.221E-08 | 2.189E-08 | -1.459E-09 | 1.338E-10 | -8.773E-12 | -1.468E-13 | 1.466E-14 | -1.448E-16 | 2.661E-17 | -9.120E-19 |
| | 4 | -2.309E-07 | -1.553E-10 | -5.827E-10 | 4.448E-11 | -9.423E-13 | 0.000E+00 | 0.000E+00 | 0.000E+00 | 0.000E+00 | 0.000E+00 | 0.000E+00 |

FIG. 6 (B)

2nd Surface of fθ1

| CUY | CYZ | AY | AZ |
|---|---|---|---|
| 0.0204082 | 0.0179363 | 1 | 1 |

| | | | | | | m | | | | | |
|---|---|---|---|---|---|---|---|---|---|---|---|
| | | 0 | 1 | 2 | 3 | 4 | 5 | 6 | 7 | 8 | 9 | 10 |
| | 0 | 0.000E+00 | -6.667E-02 | 0.000E+00 | 2.044E-05 | -4.684E-06 | 7.391E-09 | -9.888E-10 | 1.234E-11 | -2.037E-13 | -9.521E-17 | 2.607E-16 |
| | 1 | 0.000E+00 | -1.127E-06 | -2.689E-06 | 1.774E-07 | -1.558E-09 | -2.888E-10 | 2.046E-11 | -7.927E-13 | 5.657E-15 | -3.536E-16 | 1.618E-17 |
| n | 2 | 2.387E-05 | -4.140E-06 | -3.284E-07 | 3.799E-08 | 2.264E-12 | 6.067E-12 | -2.478E-12 | -6.435E-14 | 3.196E-15 | 1.237E-16 | -3.821E-18 |
| | 3 | -8.930E-06 | 1.961E-07 | 1.661E-08 | -2.529E-09 | 6.180E-11 | 2.810E-12 | -2.949E-14 | -6.090E-15 | 6.149E-15 | 4.649E-18 | -6.623E-20 |
| | 4 | 2.522E-07 | -3.095E-09 | -5.120E-10 | 4.207E-11 | -9.508E-13 | 0.000E+00 | 0.000E+00 | 0.000E+00 | 0.000E+00 | 0.000E+00 | 0.000E+00 |

FIG. 6 (C)

1st Surface of fθ2

| CUY | CYZ | AY | AZ |
|---|---|---|---|
| 0.002904234 | -0.006343280 | 1 | 1 |

| | | | | | | m | | | | | |
|---|---|---|---|---|---|---|---|---|---|---|---|
| | | 0 | 1 | 2 | 3 | 4 | 5 | 6 | 7 | 8 | 9 | 10 |
| | 0 | 0.000E+00 | 1.660E-02 | 0.000E+00 | -3.927E-06 | -2.133E-07 | 3.818E-10 | 1.505E-11 | 2.572E-14 | -8.037E-16 | 1.475E-18 | -1.904E-20 |
| | 1 | 0.000E+00 | -2.644E-05 | 5.823E-07 | -1.140E-10 | 8.057E-11 | 1.705E-13 | -1.613E-14 | 7.102E-17 | -8.131E-19 | 3.084E-21 | 1.349E-23 |
| n | 2 | -8.028E-06 | -5.092E-08 | 1.020E-11 | 1.569E-11 | -6.288E-15 | -2.339E-16 | 1.893E-17 | -6.265E-19 | 1.203E-21 | 3.247E-23 | -1.577E-25 |
| | 3 | -3.363E-09 | 1.290E-10 | 3.133E-12 | 5.319E-14 | -8.741E-17 | -2.001E-18 | 1.135E-19 | -3.473E-22 | 6.745E-24 | -4.288E-27 | -5.142E-29 |
| | 4 | 2.025E-10 | 1.118E-12 | -8.987E-15 | -1.688E-16 | -9.048E-18 | 0.000E+00 | 0.000E+00 | 0.000E+00 | 0.000E+00 | 0.000E+00 | 0.000E+00 |

FIG. 6 (D)

2nd Surface of fθ2

| CUY | CYZ | AY | AZ |
|---|---|---|---|
| 0.002112237 | 0.001552636 | 1 | 1 |

| | | | | | | m | | | | | |
|---|---|---|---|---|---|---|---|---|---|---|---|
| | | 0 | 1 | 2 | 3 | 4 | 5 | 6 | 7 | 8 | 9 | 10 |
| | 0 | 0.000E+00 | 1.022E-02 | 0.000E+00 | -4.091E-06 | -4.387E-08 | 4.082E-10 | 1.591E-12 | 9.148E-16 | 2.739E-16 | 4.265E-18 | -7.011E-20 |
| | 1 | 0.000E+00 | -1.972E-05 | 3.253E-07 | -1.081E-09 | 2.945E-11 | 2.841E-13 | -9.708E-16 | 1.800E-17 | -1.643E-18 | 1.058E-20 | -3.151E-23 |
| n | 2 | -8.691E-06 | -5.126E-08 | 2.922E-10 | 1.530E-11 | -1.618E-15 | -1.539E-15 | -3.743E-18 | -6.221E-20 | 2.589E-21 | -1.455E-23 | -9.009E-26 |
| | 3 | -8.160E-09 | 4.185E-11 | 1.989E-12 | 4.893E-14 | 2.992E-16 | 2.713E-18 | 7.095E-20 | -6.659E-22 | -5.008E-24 | -4.140E-26 | 1.614E-27 |
| | 4 | 1.656E-10 | 1.372E-12 | -3.279E-15 | -1.813E-16 | -7.667E-18 | 0.000E+00 | 0.000E+00 | 0.000E+00 | 0.000E+00 | 0.000E+00 | 0.000E+00 |

FIG. 7

| CYLINDRICAL LENS 1 | | CYLINDRICAL LENS 2 | | EVALUATION FUNCTION |
|---|---|---|---|---|
| INCIDENT SURFACE | OUTGOING SURFACE | INCIDENT SURFACE | OUTGOING SURFACE | |
| CONCAVE | FLAT | CONVEX | FLAT | 2.5057E+05 |
| CONCAVE | FLAT | FLAT | CONVEX | 3.7473E+10 |
| FLAT | CONCAVE | CONVEX | FLAT | 3.8329E+05 |
| FLAT | CONCAVE | FLAT | CONVEX | 3.6352E+10 |
| CONVEX | FLAT | CONCAVE | FLAT | 2.0170E+10 |
| CONVEX | FLAT | FLAT | CONCAVE | 1.5971E+10 |
| FLAT | CONVEX | CONCAVE | FLAT | 2.6132E+10 |
| FLAT | CONVEX | FLAT | CONCAVE | 9.2217E+09 |
| CONVEX | FLAT | CONVEX | FLAT | 4.1217E+07 |
| CONVEX | FLAT | FLAT | CONVEX | 3.6945E+07 |
| FLAT | CONVEX | CONVEX | FLAT | 5.6285E+08 |
| FLAT | CONVEX | FLAT | CONVEX | 7.4775E+10 |

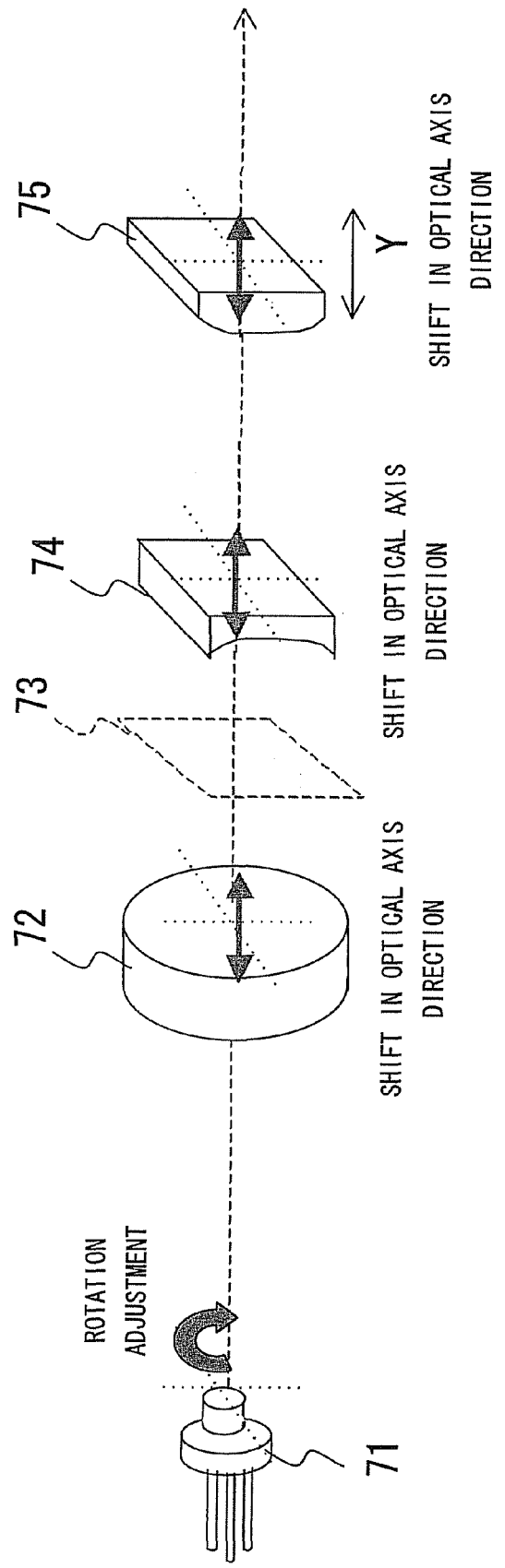

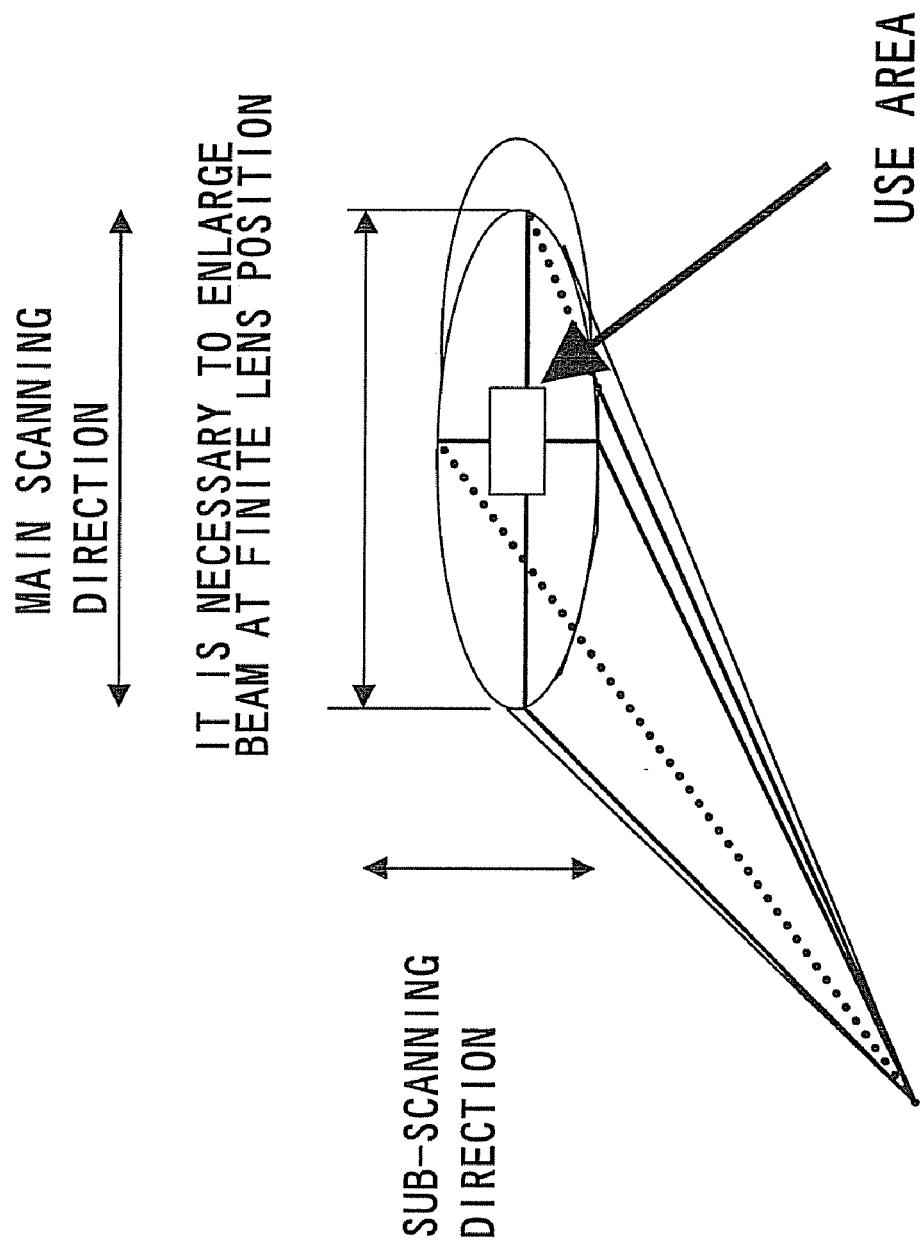

OPTICAL BEAM SCANNING DEVICE, IMAGE FORMING APPARATUS, OPTICAL BEAM SCANNING METHOD

BACKGROUND OF THE INVENTION

1. Field of the Invention

The present invention relates to an optical beam scanning device used for a laser printer, a digital copying machine or the like, and particularly to a pre-deflection optical system for guiding a light beam from a light source to a rotary deflector which deflects an incident light flux and scans it in a specified scanning direction.

2. Description of the Related Art

Hitherto, there is known a light beam scanning device which uses a rotary deflector such as a polygon mirror and scans a light flux from a light source in a main scanning direction. In such a conventional light beam scanning device, as a pre-deflection optical system to shape a divergent light beam from a light source into a light flux having a cross-sectional shape long in the main scanning direction, there are often adopted a lens to weaken the degree of divergence of the divergent light beam from the light source or to convert it into a parallel light beam or a converging light beam, and a lens to give a positive power to the light flux the degree of divergence of which has been weakened or which has been converted into the parallel light beam or the converging light beam.

However, in a case where a multi-beam optical system using divergent light beams from plural light sources is adopted in the light beam scanning device, when only the structure of the conventional light beam scanning device is used, it is difficult to adjust all conditions, such as, in the rotation axis direction of the rotary deflector, (1) the pitch of the light fluxes from the plural light sources, (2) focal positions and (3) beam diameters of the light fluxes, to be appropriate.

SUMMARY OF THE INVENTION

An embodiment of the invention has an object to provide a technique which can realize scanning with a light flux having a desired optical characteristic in a light beam scanning device adopting a multi-beam optical system.

In order to solve the problem, a light beam scanning device of the invention includes a pre-deflection optical system that shapes divergent light beams from plural light sources into a light flux having a cross-sectional shape long in a specified direction, and a rotary deflector that deflects the light flux shaped by the pre-deflection optical system and scans it in the specified direction, and is characterized in that the pre-deflection optical system includes a first optical system that weakens a degree of divergence of the divergent light beams from the plural light sources or converts them into parallel light beams or converging light beams, a second optical system including at least one lens having a negative power in a rotation axis direction of the rotary deflector, and a third optical system having a positive power in the rotation axis direction of the rotary deflector.

Besides, an image forming apparatus of the invention is characterized by including a light beam scanning device having a structure as stated above, image bearing means on which an electrostatic latent image is formed by a light flux scanned by the light beam scanning device, and developing means for revealing the electrostatic latent image formed on the photo-sensitive body.

Besides, an optical beam scanning method of the invention shapes divergent light beams from plural light sources into a light flux having a cross-sectional shape long in a specified direction, and deflects the shaped light flux by a rotary deflector to scan it in the specified direction, and is characterized by comprising weakening a degree of divergence of the divergent light beams from the plural light sources or converting them into substantially parallel light beams or converging light beams, giving a negative power to the processed light flux by at least one lens having a negative power in a rotation axis direction of the rotary deflector, giving a positive power to the light flux to which the negative power has been given by a lens having a positive power in the rotation axis direction of the rotary deflector, and deflecting the light flux to which the positive power has been given by the rotary deflector to scan it in the specified direction.

DESCRIPTION OF THE DRAWINGS

FIG. 6(A) is a view showing an example of coordinate data indicating a lens surface shape of an imaging lens (fθ1 lens) 91 at an incident surface side.

FIG. 6(B) is a view showing an example of coordinate data showing a lens surface shape of the imaging lens (fθ1 lens) 91 at an outgoing surface side.

FIG. 6(C) is a view showing an example of coordinate data indicating a lens surface shape of an imaging lens (fθ2 lens) 92 at an incident surface side.

FIG. 6(D) is a view showing an example of coordinate data indicating a lens surface shape of the imaging lens (fθ2 lens) 92 at an outgoing surface side.

FIG. 7 is a view showing combinations of shapes of two cylindrical lenses to form a linear image of a light flux on a reflecting surface of a polygon mirror and results of an evaluation function for optimization.

FIG. 8 is a schematic view for explaining a beam interval adjustment in a pre-deflection optical system 70.

DESCRIPTION OF THE EMBODIMENTS

Hereinafter, embodiments of the invention will be described with reference to the drawings.

Figure 1:
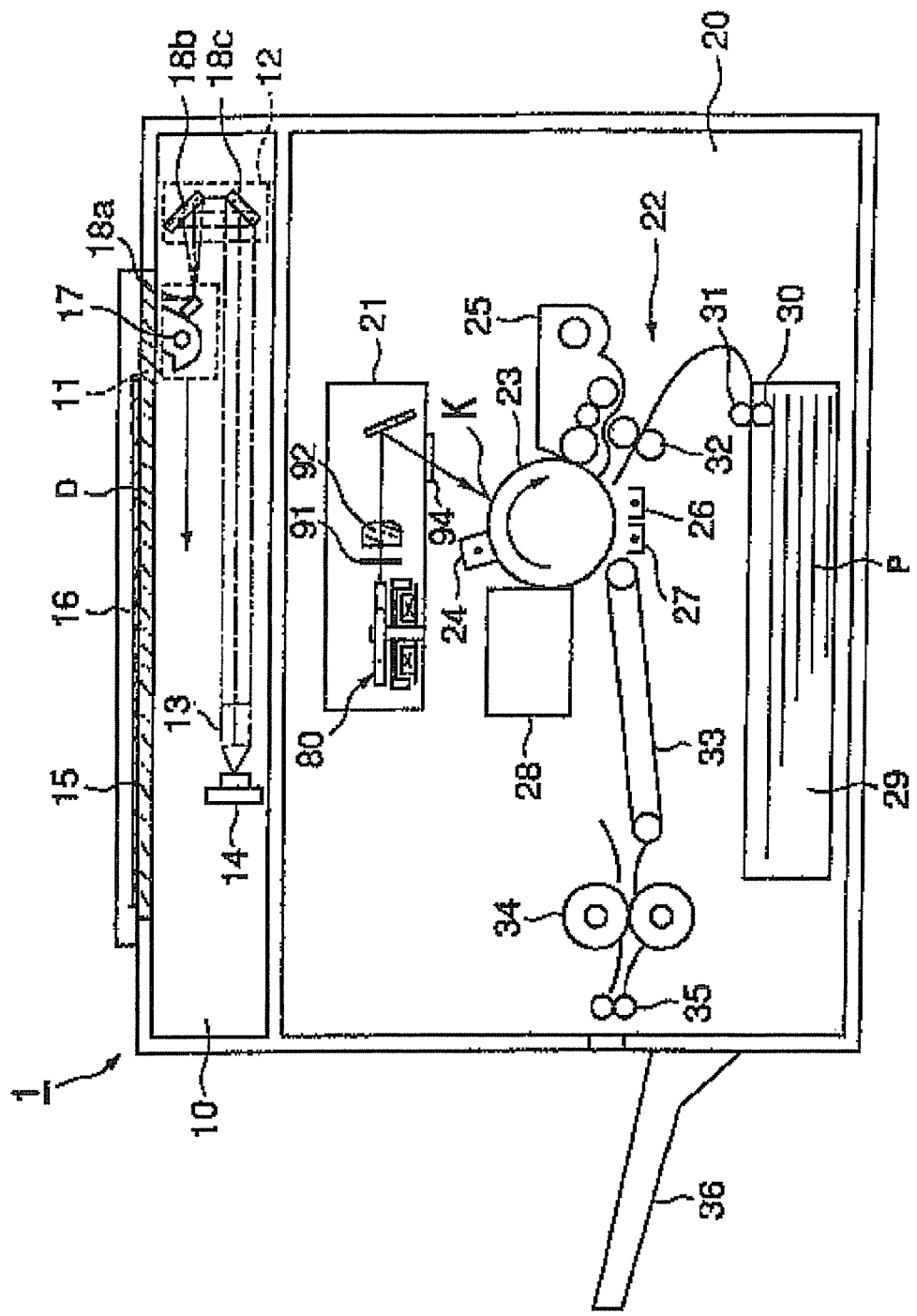
FIG. 1 is a view showing a digital copying machine as an image forming apparatus including a light beam scanning device of an embodiment of the invention.

FIG. 1 is a view showing a digital copying machine (for example, MFP: Multi Function Peripheral, etc.) as an image forming apparatus including a light beam scanning device of an embodiment of the invention.

As shown in FIG. 1, a digital copying apparatus 1 includes, for example, a scanner part 10 as image reading means and a printer part 20 as image forming means.

The scanner part 10 includes a first carriage 11 formed movably in a direction of an arrow, a second carriage 12 driven and moved by the first carriage 11, an optical lens 13 to give a specified imaging characteristic to a light beam from the second carriage 12, a photoelectric conversion element 14 that photoelectrically converts the light beam to which the specified imaging characteristic has been given by the optical lens 13 and outputs an electric signal, a document table 15 to hold a document D, a document fixing cover 16 to press the document D to the document table 15, and the like.

The first carriage 11 includes a light source 17 to illuminate the document D, and a mirror 18a to reflect a reflected light beam, which has been reflected by the document D illuminated by a light beam emitted by the light source 17, to the second carriage 12.

The second carriage 12 includes a mirror 18b to bend the light beam transmitted from the mirror 18a of the first carriage 11 by 90°, and a mirror 18c to further bend the light beam, which has been bent by the mirror 18b, by 90°.

The document D placed on the document table 15 is illuminated by the light source 17, and reflects the reflected light beam in which the variations of light and shade corresponding to the presence/absence of an image are distributed. The reflected light beam of the document D is incident on the optical lens 13 as image information of the document D through the mirrors 18a, 18b and 18c.

The reflected light beam guided to the optical lens 13 from the document D is condensed onto the light receiving surface of the photoelectric conversion element (CCD sensor) 14 by the optical lens 13.

When the start of image formation is instructed from a not-shown operation panel or an external device, the first carriage 11 and the second carriage 12 are once moved by driving of a not-shown carriage driving motor to a home position determined so that they have a specified positional relation relative to the document table 15, and then are moved at a specified speed along the document table 15, so that the image information of the document D, that is, the image light beam reflected from the document D is cut out to have a specified width in the direction in which the mirror 18a is extended, that is, in a main scanning direction and is reflected toward the mirror 18b, and is successively taken out in units of the width cut out by the mirror 18a and in a direction perpendicular to the direction in which the mirror 18a is extended, that is, in a sub-scanning direction, and all image information of the document D is guided to the CCD sensor 14. Incidentally, an electric signal outputted from the CCD sensor 14 is an analog signal, and is converted into a digital signal by a not-shown A/D converter, and is temporarily stored as an image signal into a not-shown image memory.

In the manner as stated above, the image of the document D placed on the document table 15 is converted into, for example, an 8-bit digital image signal indicating the light and shade of the image by a not-shown image processing part for each line along a first direction in which the mirror 18a is extended, by the CCD sensor 14.

The printer part 20 includes a light beam scanning device 21 as an exposure device described in a later section, and an electrophotographic image forming part 22 capable of forming an image on a recording sheet P as a medium on which an image is to be formed.

The image forming part 22 includes a drum-shaped photosensitive body (hereinafter referred to as a photosensitive drum) 23 that is rotated by an after-mentioned main motor so that its outer peripheral surface moves at a specified speed, and is irradiated (scanned) with a laser beam L from the light beam scanning device 21 so that an electrostatic latent image corresponding to image data, that is, an image of the document D is formed, a charging device 24 to give a surface potential with a specified polarity to the surface of the photosensitive drum (image bearing means) 23, a developing device (developing part, developing means) 25 to selectively supply a toner as a visualizing agent to the electrostatic latent image formed on the photosensitive drum 23 by the light beam scanning device and performs development (revealing an image), a transfer device 26 that gives a specified electric field to the toner image formed on the outer periphery of the photosensitive drum 23 by the developing device 25 and transfers it onto the recording sheet P, a separating device 27 that releases and separates the recording sheet P on which the toner image has been transferred by the transfer device and the toner between the recording sheet P and the photosensitive drum 23 from electrostatic attachment (from the photosensitive drum 23), a cleaning device 28 that removes the transfer residual toner remaining on the outer peripheral surface of the photosensitive drum 23 and returns the potential distribution of the photosensitive drum 23 to the state before the surface potential is supplied by the charging device 24, and the like. Incidentally, the charging device 24, the developing device 25, the transfer device 26, the separating device 27 and the cleaning device 28 are sequentially arranged along the arrow direction in which the photosensitive drum 23 is rotated. Besides, the laser beam L from the light beam scanning device 21 is irradiated to a specified position K on the photosensitive drum 23 between the charging device 24 and the developing device 25.

The image signal read from the document D by the scanner part 10 is converted into a printing signal in a not-shown image processing part by a processing such as, for example, a contour correction or a gradation processing for halftone display, and is further converted into a laser modulation signal to change the light intensity of the laser beam emitted from an after-described semiconductor laser element of the light beam scanning device 21 into one of the intensity at which the electrostatic latent image can be recorded on the outer periphery of the photosensitive drum 23 to which a specified surface potential has been given by the charging device 24 and the intensity at which the latent image is not recorded.

Each of semiconductor laser elements of the light beam scanning device 21 described below is intensity-modulated in accordance with the foregoing laser modulation signal, and emits a light beam so that the electrostatic latent image is recorded at a specified position of the photosensitive drum 23 correspondingly to the specified image data. The light beam from the semiconductor laser element is deflected in a first direction as the same direction as a reading line of the scanner part 10 by a polygon mirror (rotary deflector) as after-described light scanning means in the light beam scanning device 21, and is irradiated onto the specified position K on the outer periphery of the photosensitive drum 23.

The photosensitive drum 23 is rotated in the arrow direction at a specified speed, so that, similarly to the movement of the first carriage 11 and the second carriage 12 of the scanner part 10 along the document table 7, the laser beam from the semiconductor laser element (light source) sequentially deflected by the polygon mirror is exposed onto the outer periphery of the photosensitive drum 23 for each line at specified intervals.

In the manner as stated above, the electrostatic latent image corresponding to the image signal is formed on the outer periphery of the photosensitive drum 23.

The electrostatic latent image formed on the outer periphery of the photosensitive drum 23 is developed with the toner from the developing device 25, is transported to a position opposite to the transfer device 26 by the rotation of the photosensitive drum 23, and is transferred onto the recording sheet P, which is taken out from a sheet cassette 29 by a paper feed roller 30 and a separation roller 31 and is supplied while the timing is adjusted by an aligning roller 32, by the electric field from the transfer device 26.

The recording sheet P on which the toner image has been transferred, together with the toner, is separated by the separating device 27, and is guided to a fixing device 34 by a transport device 33.

The toner (toner image) is fixed by the heat and pressure from the fixing device 34 onto the recording sheet P guided to the fixing device 34, and the sheet is discharged to a tray 36 by a paper discharge roller 35.

On the other hand, the photosensitive drum 23 after the toner image (toner) has been transferred on the recording sheet P by the transfer device 26 is made to face the cleaning device 28 as a result of the subsequent rotation, the transfer remaining toner (residual toner) remaining on the outer periphery is removed, return is made to a state (initial state) before the surface potential is supplied by the charging device 24, and next image formation becomes possible.

The above process is repeated, so that a continuous image forming operation becomes possible.

As stated above, with respect to the document D set on the document table 15, the image information is read by the scanner part 10, the read image information is converted into the toner image by the printer part 20 and is outputted to the recording sheet P, so that copying is performed.

Incidentally, although the description of the image forming apparatus has been made while the digital copying machine is used as an example, for example, a printer apparatus in which an image reading part does not exist may be used.

Figure 2:
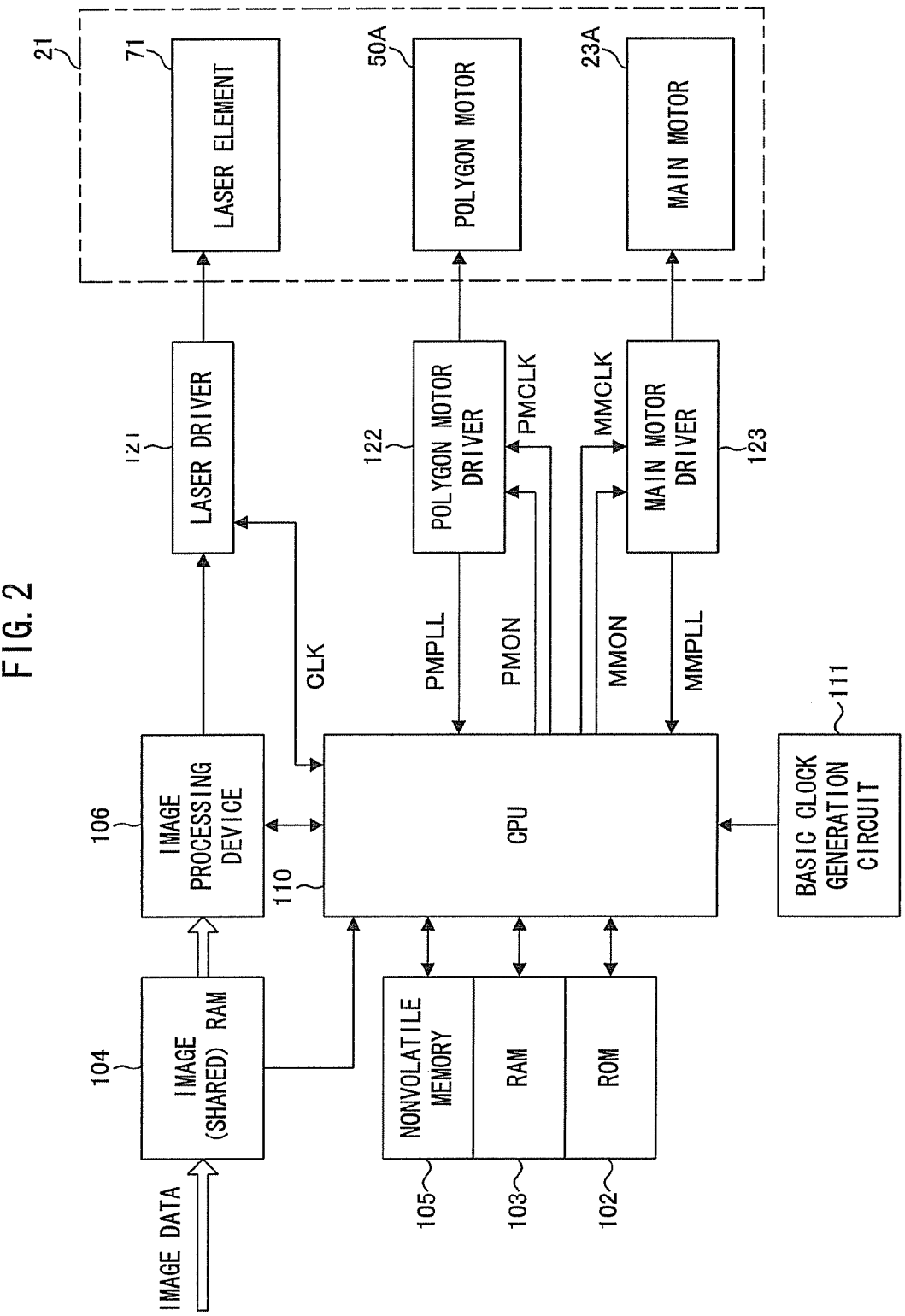
FIG. 2 is a schematic block diagram showing an example of a drive circuit of a digital copying apparatus.

FIG. 2 is a schematic block diagram showing an example of a drive circuit of a digital copying apparatus including a light beam scanning device having the structure as described above.

A CPU 110 as a main control device is connected with a ROM (Read Only Memory) 102 in which a specified operation rule and initial data are stored, a RAM 103 to temporarily store inputted control data, a shared (image) RAM 104 which holds image data from the CCD sensor 14 or image data supplied from an external device and outputs the image data to an image processing circuit described below, an NVM (nonvolatile memory) 105 which holds, even when power application to the copying apparatus 1 is stopped, data stored up to that time by battery backup, an image processing device 106 which adds a specified image processing to the image data stored in the image RAM 104 and outputs it to a laser driver described below, and the like.

The CPU 110 is also connected with a laser driver 121 to cause a semiconductor laser element (light source) 71 of the light beam scanning device 21 to emit light, a polygon motor driver 122 which drives a polygon motor 50A to rotate a polygon mirror 80, a main motor driver 123 which drives a main motor 23A to drive the photosensitive drum 23 and a transport mechanism of an accompanying sheet (member to be transferred), and the like.

Figure 3:
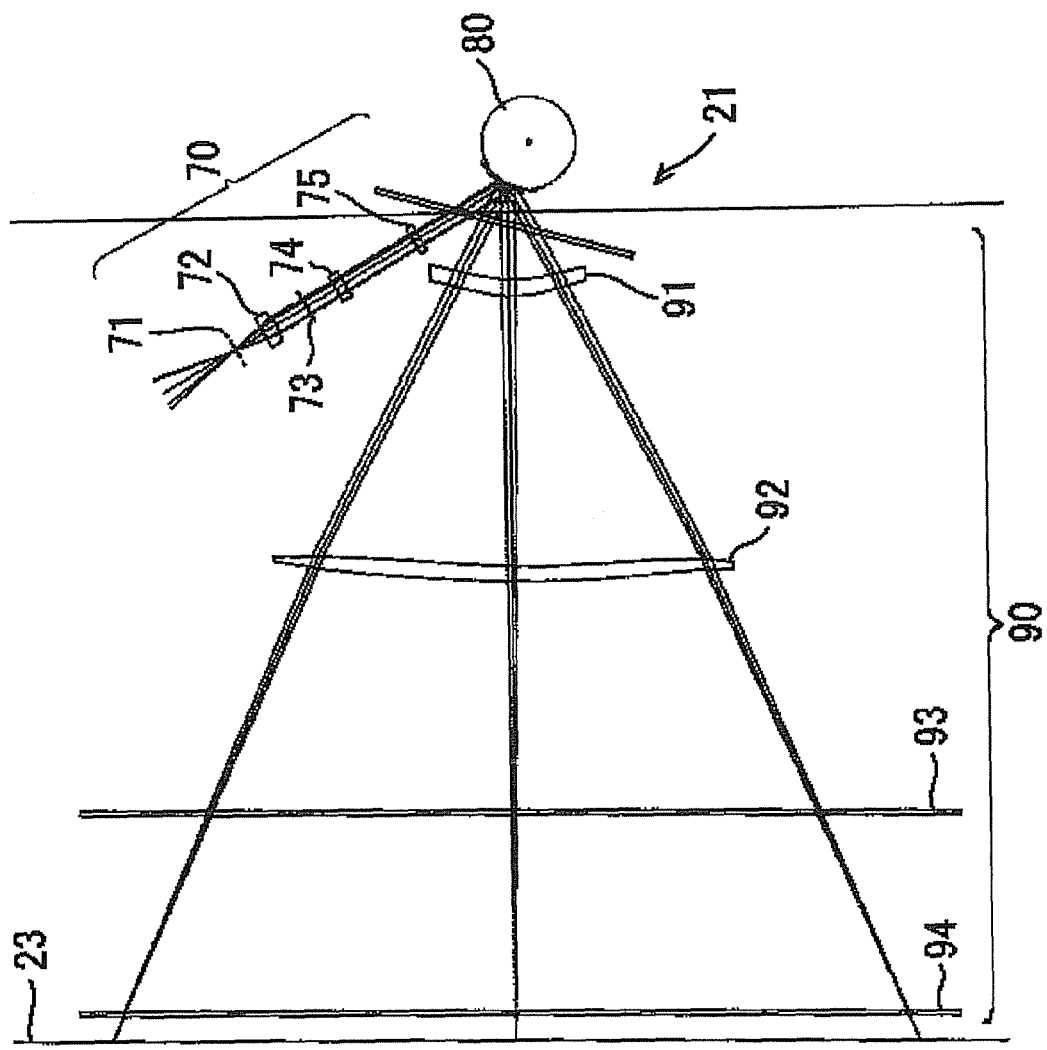
FIG. 3 is a schematic view for explaining the structure of the light beam scanning device shown in FIG. 1.
Figure 4:
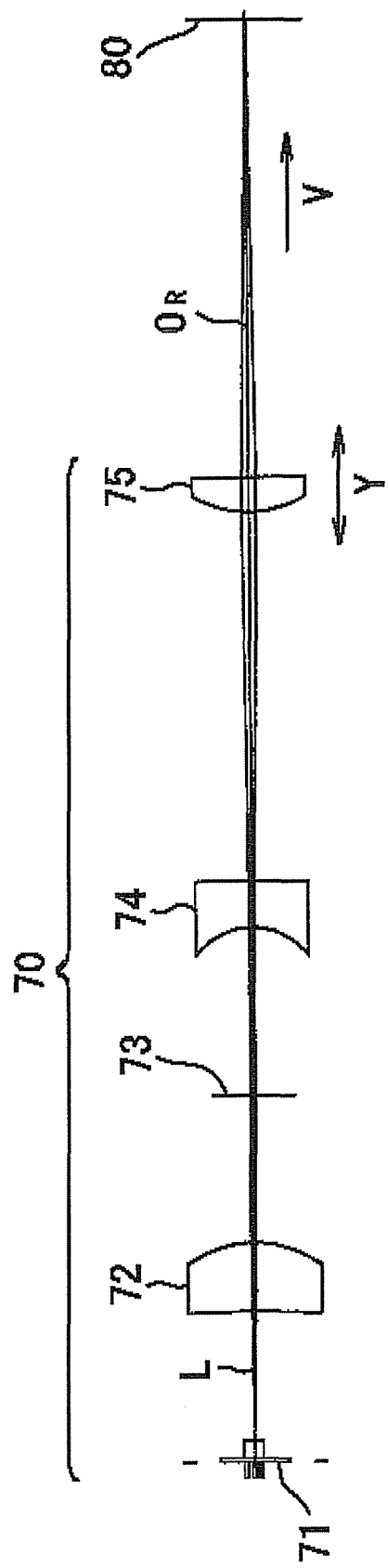
FIG. 4 is a schematic view for explaining the structure of the light beam scanning device shown in FIG. 1.

FIG. 3 and FIG. 4 are schematic views for explaining the structure of the light beam scanning device shown in FIG. 1. Incidentally, FIG. 3 is a schematic plan view in which optical elements arranged between the light source (semiconductor laser element) 71 included in the light beam scanning device and the photosensitive drum (object to be scanned) 23 are seen from a direction perpendicular to the main scanning direction (first direction) as the direction parallel to the direction in which the light flux directed to the photosensitive drum from the polygon mirror is-scanned by the polygon mirror and the turnover by the mirror is expanded and explained, and FIG. 4 is a schematic sectional view shown such that a sub-scanning direction (second direction) perpendicular to the direction shown in FIG. 3, that is, the main scanning direction is on a plane.

As shown in FIG. 3 and FIG. 4, the light beam scanning device 21 includes the laser array element (plural light sources) 71 to emit the laser beam (light flux) L of, for example, 785 nm, a lens 72 (first optical system, first light flux processing means) to convert the cross-sectional shape of the laser beam L emitted from the laser array element 71 into a converging light beam, a parallel light beam or a divergent light beam, an aperture 73 to limit the light amount (light flux width) of the laser beam L having passed through the lens 72 to a specified magnitude, a lens 74 (second optical system, second light flux processing means) and a lens 75 (first optical system, first light flux processing means), in which a power is given only in the sub-scanning direction in order to shape the cross-sectional shape of the laser beam L the light amount of which has been limited by the aperture 73 into a specified cross-sectional beam shape. As stated above, the light beam scanning device of this embodiment adopts the so-called multi-beam optical system in which divergent light beams from plural light sources arranged at positions different from each other in the sub-scanning direction are used as the light sources.

Hereinafter, the effect obtained by adopting the multi-beam optical system will be described in brief. In the image forming apparatus, the sub-scanning direction in the optical system corresponds to the transport direction of the transfer member, and the main scanning direction indicates a direction perpendicular to the transport direction in the transfer member surface. Besides, it is assumed that an image surface indicates a transfer member surface, and an imaging surface indicates a surface on which an image of a beam is actually formed.

In general, an image process speed (paper transport speed), an image resolution, a motor rotation speed, the number of polygon mirror surfaces, the number of beams, a motor rotation speed, an image frequency and the like have the following relation.

$$Vr = \frac{60 * P * D}{25.4 * m * N} \quad (1)$$

$$fm = \frac{2\pi * P * D^2 * W}{25.4^2 * m * N * A} \quad (2)$$

P (mm/s): process speed (paper transport speed)
D (dpi): image resolution (number of dots per inch)
Vr (rpm): polygon motor rotation speed
fm (Hz): image frequency
N: number of polygon mirror surfaces
m: number of beams
W: scanning width
A: half value of scanning angle Thus, for realization of high speed and high resolution, it becomes necessary that the polygon mirror rotation speed is raised, the image frequency is raised, or the number of polygon mirror surfaces is increased.

However, when the polygon mirror is rotated at high speed, a load to the motor is large, and the motor cost is raised. Besides, the occurrence of noise, vibration, and heat is large, and countermeasures against these become necessary. Besides, since the image frequency has a limit, it is effective to increase the number of beams by adopting the multi-beam scanning optical system.

The lens 72 is a single finite focal lens, a collimate lens, or a lens to weaken the degree of divergence of a divergent light beam, the lens 74 is a cylindrical lens having a negative power in the sub-scanning direction, and the lens 75 is a cylindrical lens having a positive power in the sub-scanning direction. A pre-deflection optical system 70 includes the lens 72, the aperture 73, the lens 74, and the lens 75. The pre-deflection optical system 70 has a function to shape divergent light beams from plural light sources into a light flux having a cross-sectional shape long in the main scanning direction.

In the direction in which the laser beam L to which a specified sectional beam shape is given by the pre-deflection optical system 70 travels, the polygon mirror 80 is provided which is formed integrally with a not-shown polygon mirror motor rotating at a specified speed and scans the laser beam L, the cross-sectional beam shape of which has been shaped into the specified shape by the cylindrical lenses 74 and 75, in the main scanning direction to the photosensitive drum (surface to be scanned) 23 positioned at a later stage.

Between the polygon mirror 80 and the photosensitive drum 23, an imaging optical system 90 is provided which forms an image of the laser beam L, which is continuously reflected by each reflecting surface of the polygon mirror 80, substantially linearly along the axial direction of the photosensitive drum 23.

The imaging optical system 90 includes imaging lenses (normally called as fθ lenses) 91 and 92 that irradiate the laser beam L, which is continuously reflected by the respective reflecting surfaces of the polygon mirror 80, from one end to the other end of the photosensitive drum 23 in the longitudinal (axial line) direction at the exposure position K shown in FIG. 1 while the position on the photosensitive drum 23 at the time of irradiation to the photosensitive drum 23 is made to be proportional to the rotation angle of each reflecting surface of the polygon mirror 80, and that can provide the convergence in which a specified relation is given based on the angle at which the polygon mirror 80 is rotated, so that a specified cross-sectional beam diameter is obtained at any position on the photosensitive drum 23 in the longitudinal direction, dust-proof glasses 93 and 94 to prevent toner, dust, paper powder or the like floating in the image forming part 22 from going around and entering a not-shown housing of the light beam scanning device 21. Here, at least one of the imaging lenses 91 and 92 is formed of a plastic lens.

Incidentally, the light path of the laser beam L from the semiconductor laser element 71 to the photosensitive drum 23 in the light beam scanning device 21 is bent in the not-shown housing of the light beam scanning device 21 by plural not-shown mirrors and the like. Besides, curvatures of the imaging lenses 91 and 92 in the main scanning direction and the sub-scanning direction, and the light path between the polygon mirror 80 and the photosensitive drum 23 are optimized, so that the imaging lenses 91 and 92 and at least one of not-shown mirrors can also be integrally formed.

Subsequently, the structure of the light beam scanning device of the embodiment and its operation will be described in detail.

In the light beam scanning device 21 shown in FIG. 3 and FIG. 4, the divergent laser beam L emitted from the laser array element 71 is converted into a converging light beam, a parallel light beam or a divergent light beam in cross-sectional beam shape by the lens 72.

The laser beam L whose cross-sectional beam shape has been converted into a specified shape passes through the aperture 73 so that it is adjusted to have an optimum light flux width and light amount, and specified convergence is given only in the sub-scanning direction by the cylindrical lenses 74 and 75. By this, the laser beam L has a linear shape extending in the main scanning direction on each reflecting surface of the polygon mirror 80.

The polygon mirror 80 is, for example, a regular octahedron, and is formed so that the diameter Dp of its inscribed circle becomes 34.64 mm.

The laser beam L guided by each of the plural reflecting surfaces arranged on the outer peripheral surface of the polygon mirror 80 and continuously reflected and linearly scanned (deflected) by the rotation of the polygon mirror 80 is given a specified imaging characteristic by the imaging lenses 91 and 92 of the imaging optical system 90 so that the cross-sectional beam diameter becomes roughly uniform at least in the main scanning direction on the photosensitive drum 23 (image surface), and an image is formed substantially linearly on the surface of the photosensitive drum 23. Besides, a correction is performed by the imaging lens 91 so that the rotation angle of each reflecting surface of the polygon mirror 80 and the imaging position of the light flux imaged on the photosensitive drum 23, that is, the scanning position have a proportional relation. Accordingly, the scanning speed of the light flux linearly scanned in the main scanning direction on the photosensitive drum 23 becomes constant in the whole scanning range by the imaging lens 91.

Incidentally, the imaging lenses 91 and 92 are given curvatures (sub-scanning direction curvatures) capable of also correcting a shift of a scanning position in the sub-scanning direction caused by a fact that each reflecting surface of the polygon mirror 80 is unparallel to the sub-scanning direction (that is, a slant occurs in each reflecting surface). Further, the curvature of field in the sub-scanning direction is also corrected. In order to correct these optical characteristics, the curvatures of the imaging lenses 91 and 92 in the sub-scanning direction are set so that they are changed according to the scanning position.

Figure 5:
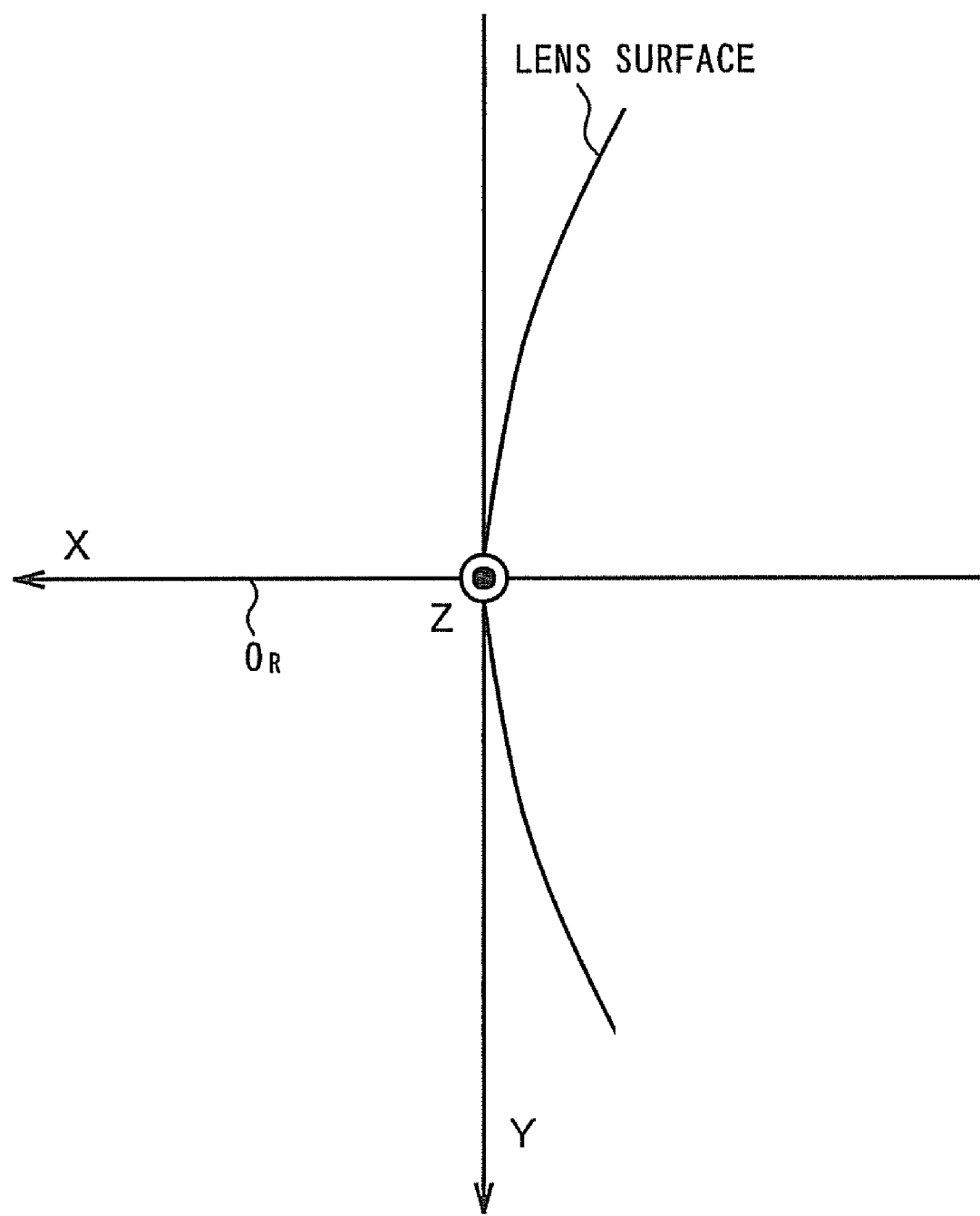
FIG. 5 is a view showing a coordinate system for defining the shape of a lens surface.

In the case where the shape of a lens surface is expressed in a coordinate system as shown in FIG. 5, the shape of the lens surface of the imaging lenses 91 and 92 is defined by, for example, $$X = \frac{CUY*y^2 + CUZ*z^2}{1 + \sqrt{1 - AY*CUY^2*y^2 - AZ*CUZ^2*z^2}} + \sum_{n=0}\sum_{m=0} A_{mn}y^m z^{2n} \quad (3)$$

Incidentally, FIG. 6(A) is a view showing an example of coordinate data indicating the lens surface shape of the imaging lens (fθ1 lens) 91 at the incident surface side, FIG. 6(B) is a view showing an example of coordinate data indicating the lens surface shape of the imaging lens (fθ1 lens) 91 at the outgoing surface side, FIG. 6(C) is a view showing an example of coordinate data indicating the lens surface shape of the imaging lens (fθ2 lens) 92 at the incident surface side, and FIG. 6(D) is a view showing an example of coordinate data indicating the lens surface shape of the imaging lens (fθ2 lens) 92 at the outgoing surface side.

By using the imaging lens 91 as stated above, since the rotation angle θ of each reflecting surface of the polygon mirror 80 is substantially proportional to the position of the laser beam L imaged on the photosensitive drum 23, the position where the laser beam L is imaged on the photosensitive drum 23 can be corrected.

Besides, the imaging lenses 91 and 92 can correct the position shift in the sub-scanning direction which is caused by the deviation of inclination in the sub-scanning direction among the respective reflecting surfaces of the polygon mirror 80, that is, the fluctuation in the amount of surface slant. In detail, the polygon mirror surface and the photosensitive drum 23 are made to have a substantially optically conjugate relation by the imaging lenses 91 and 92, and accordingly, even in the case where the inclination defined between an arbitrary reflecting surface of the polygon mirror 80 and the rotation axis of the polygon mirror 80 is different (between the respective reflecting surfaces), the shift of the scanning position, in the sub-scanning direction, of the laser beam L guided on the photosensitive drum 23 can be corrected.

Incidentally, since the cross-sectional beam diameter of the laser beam L depends on the wavelength of the light flux L emitted by the semiconductor laser element 71, it is made 655 nm, or 630 nm, or a shorter wavelength so that the cross-sectional beam diameter of the laser beam L can be made further small.

The return mirror after the deflection is constructed of a plane surface. That is, the surface slant correction is performed by only the fθ lens. The fθ lens may be, for example, a toric lens which has a rotation symmetric axis with respect to the main scanning axis and in which the curvature in the sub-scanning direction varies according to the scanning position. By doing so, the reflective power in the sub-scanning direction varies according to the scanning position, and scanning line bending can be corrected. Further, in the case where the curved surface in the sub-scanning direction has the rotation symmetric axis, the degree of freedom of curvature in the sub-scanning direction is extended and the correction can be performed with higher accuracy.

Next, the details of the structure of the pre-deflection optical system in the light beam scanning device of the embodiment and its effect will be described.

It is necessary that at least one of the lenses 74 and 75 in the pre-deflection optical system 70 is a cylindrical lens having a power only in the sub-scanning direction in order to correct the surface slant of the polygon mirror 80.

As described above, the pre-deflection optical system 70 in this embodiment includes the lens 72 (first optical system) that weakens the degree of divergence of the divergent light beams from the plural light sources or converts them into the parallel light beams or converging light beams, the lens 74 (second optical system) made of at least one lens having a negative power in the rotation axis direction of the rotary deflector, and the lens 75 (third optical system) having a positive power in the rotation axis direction of the rotary deflector.

FIG. 7 is a view showing combinations of shapes of two cylindrical lenses to form an image of a light flux linearly on the reflecting surface of the polygon mirror 80 and results of an evaluation function for optimization. Here, the damped least squares method is used for the optimization. From FIG. 7, it is understood that the result of the evaluation function is best when the first (upstream side in the light axis OR direction of the pre-deflection optical system) cylindrical lens 74 has a negative power and the second (downstream side in the light axis OR direction of the pre-deflection optical system) cylindrical lens 75 has a positive power.

From the result shown in FIG. 7, this embodiment adopts the structure in which the result of the evaluation function is best and the cylindrical lens 74 (second optical system) is a single lens having a negative power at the incident surface side of the light flux and a flat surface at the outgoing surface side, and the cylindrical lens 75 (third optical system) is a single lens having a positive power at the incident surface side and a flat surface at the outgoing surface side. Here, the radius of curvature of the incident surface of the cylindrical lens 74 has the negative power and is, for example, −7.79 mm, and the radius of curvature of the incident surface of the cylindrical lens 75 has the positive power and is, for example, 11.49 mm. That is, the structure is such that the cylindrical lens 74 (second optical system) has the stronger power than the cylindrical lens 75 (third optical system).

As stated above, in the so-called multi-beam optical system in which the light source includes plural light sources, the structure is made such that the second optical system having the negative power is arranged in the pre-deflection optical system, so that a desired optical magnification can be obtained by the cooperation of the second optical system and the third optical system. That is, by this structure, in the multi-beam optical system, it becomes possible to realize that (1) the beam diameter is narrowed to a desired width in the sub-scanning direction in order to perform the surface slant correction, (2) the beam pitch on the image surface is made a desired interval, and (3) the focal position of the beam in the sub-scanning direction is made the image surface position, and a contribution can be made to the improvement of the optical characteristic as the light beam scanning device.

Figure 9:
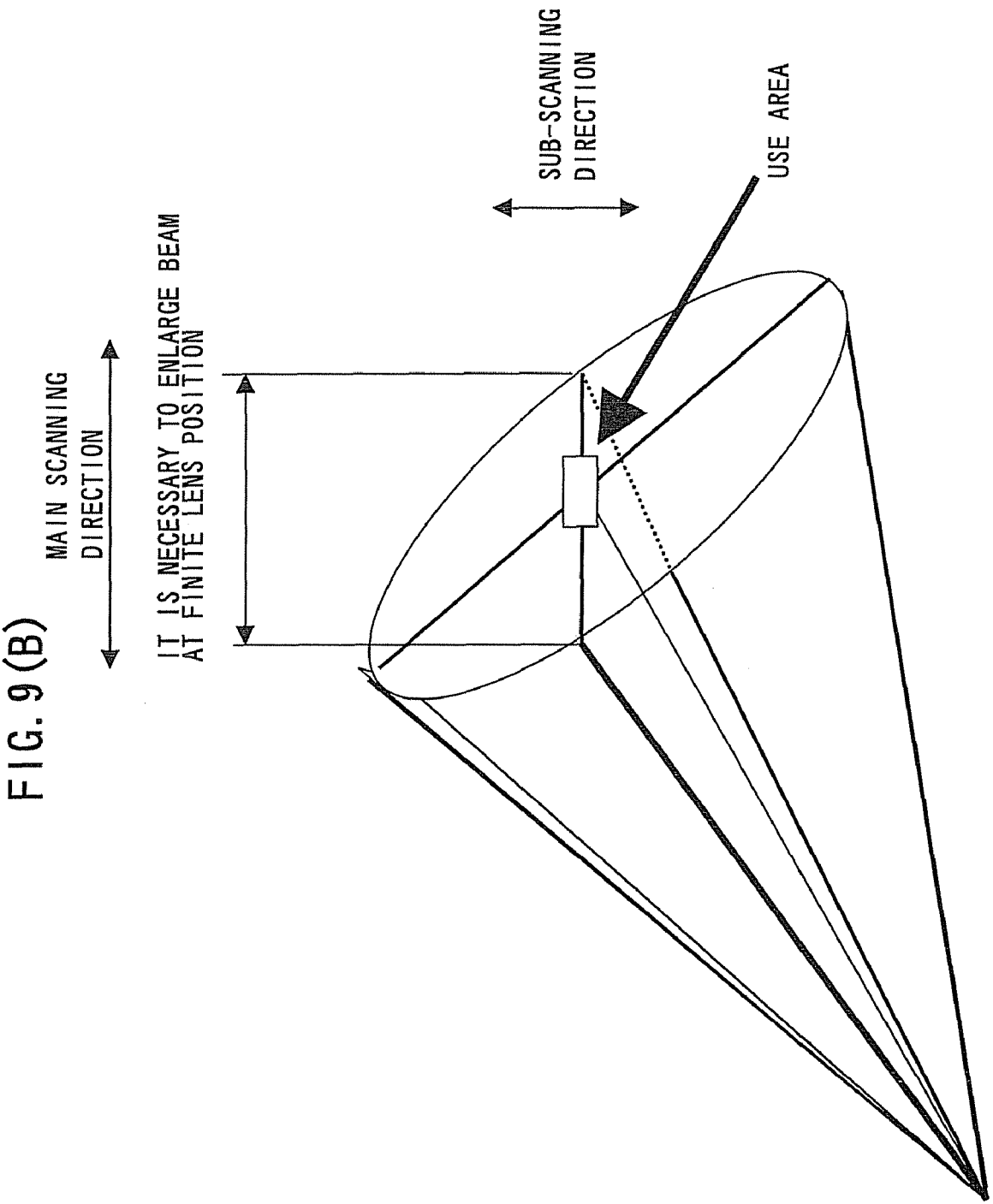
FIG. 9(A) is a schematic view for explaining the beam interval adjustment in the pre-deflection optical system 70.
FIG. 9(B) is a schematic view for explaining the beam interval adjustment in the pre-deflection optical system 70.
Figure 10:
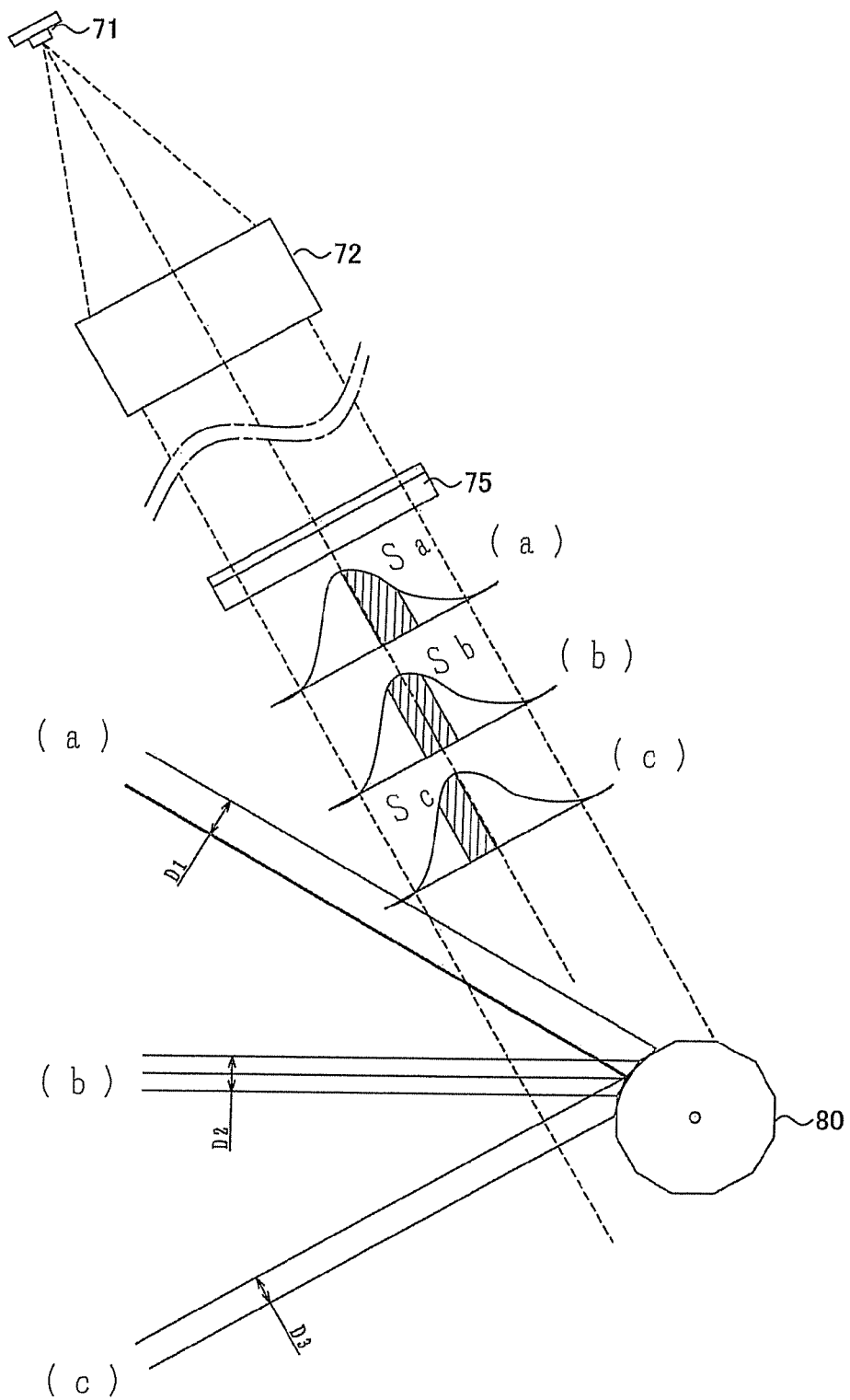
FIG. 10 is a schematic view for explaining the beam interval adjustment in the pre-deflection optical system 70.

Subsequently, an adjustment method of a beam interval in the pre-deflection optical system of the light beam scanning device of the embodiment will be described. FIG. 8 to FIG. 10 are schematic views for explaining the beam interval adjustment in the pre-deflection optical system 70.

In the case of an over illumination type, since the width of a light flux is changed by a scanning angle, the fluctuation in the light amount on the image surface becomes large. FIG. 10 shows the width of the light flux reflected by the polygon mirror in the case where the beam incident on the polygon mirror and the light axis of the post-deflection optical system form an angle on the main scanning plane surface (case of not 0°). Here, when the reflection widths at the incident side (a) to the polygon mirror, at the center position (b) in the scanning area, and at the opposite side (c) to the incident side are made D1, D2 and D3, D1>D2>D3 is established, and the fluctuation occurs in the light amount on the image surface. Besides, the figure shows also the intensity distribution of the light flux before the incidence on the polygon mirror. Since the beam widths at (a), (b) and (c) are different, and the laser beam is such that the intensity distribution of the light flux to be used has the Gaussian distribution, Sa>Sc and Sb>Sc are established. Since the light amount becomes a volume of a portion used in the beam intensity distribution, when the light amount on the image surface is made Pa, Pb and Pc, Pa>Pc and Pb>Pc are established. Thus, the fluctuation in the light amount in the over illumination optical system is larger than that in the under illumination optical system.

In order to adjust the interval of light fluxes from plural light sources in the sub-scanning direction on the image surface, when the LD array (semiconductor laser element 71) is rotation adjusted, an optical loss at the aperture 73 becomes large in the under illumination optical system. Further, in the over illumination optical system, in order to reduce the fluctuation of the light amount due to the difference of position used in the Gaussian distribution according to the deflection position, it is necessary to increase the main scanning beam diameter on the reflecting surface of the polygon mirror 80. In this case, when the LD array is rotated, the use area is very small and the optical efficiency becomes poor. Here, when the output of the LD array is increased, the influence of crosstalk becomes high, and therefore, an increase in output is difficult. Thus, there is a problem that when the rotation adjustment of the LD array is performed, the image surface energy amount becomes insufficient.

Then, in this embodiment, the structure is made such that in the optical parts constituting the pre-deflection optical system, the cylindrical lens 75 (third optical system) having the positive power is supported by a support part (support means) 75*h* movably in the optical axis direction, and the cylindrical lens 75 is moved in the optical axis direction, so that the beam pitch is adjusted.

FIG. 11(A) and FIG. 11(B) are views showing an example of the support part 75*h*. FIG. 11(A) is a plan view in which the support part to support the cylindrical lens 75 is seen from above, and FIG. 11(B) is a view in which a section in a vertical surface including the optical axis is seen from a direction parallel to the main scanning direction. As shown in the figures, the support part 75*h* in this embodiment presses the cylindrical lens 75 to a holder 75*a* and supports it by a plate spring 75*s* fixed to the holder 75*a* of, for example, aluminum by a screw 75*n*. Two long holes 75*m* extending in the optical axis OR direction are formed in a base portion extending in the optical axis direction from the lower part of the holder 75*a*, and the support part 75*h* is fixed to a not-shown housing of the light beam scanning device 21 by screws 75*w* inserted in these long holes.

Figure 12:
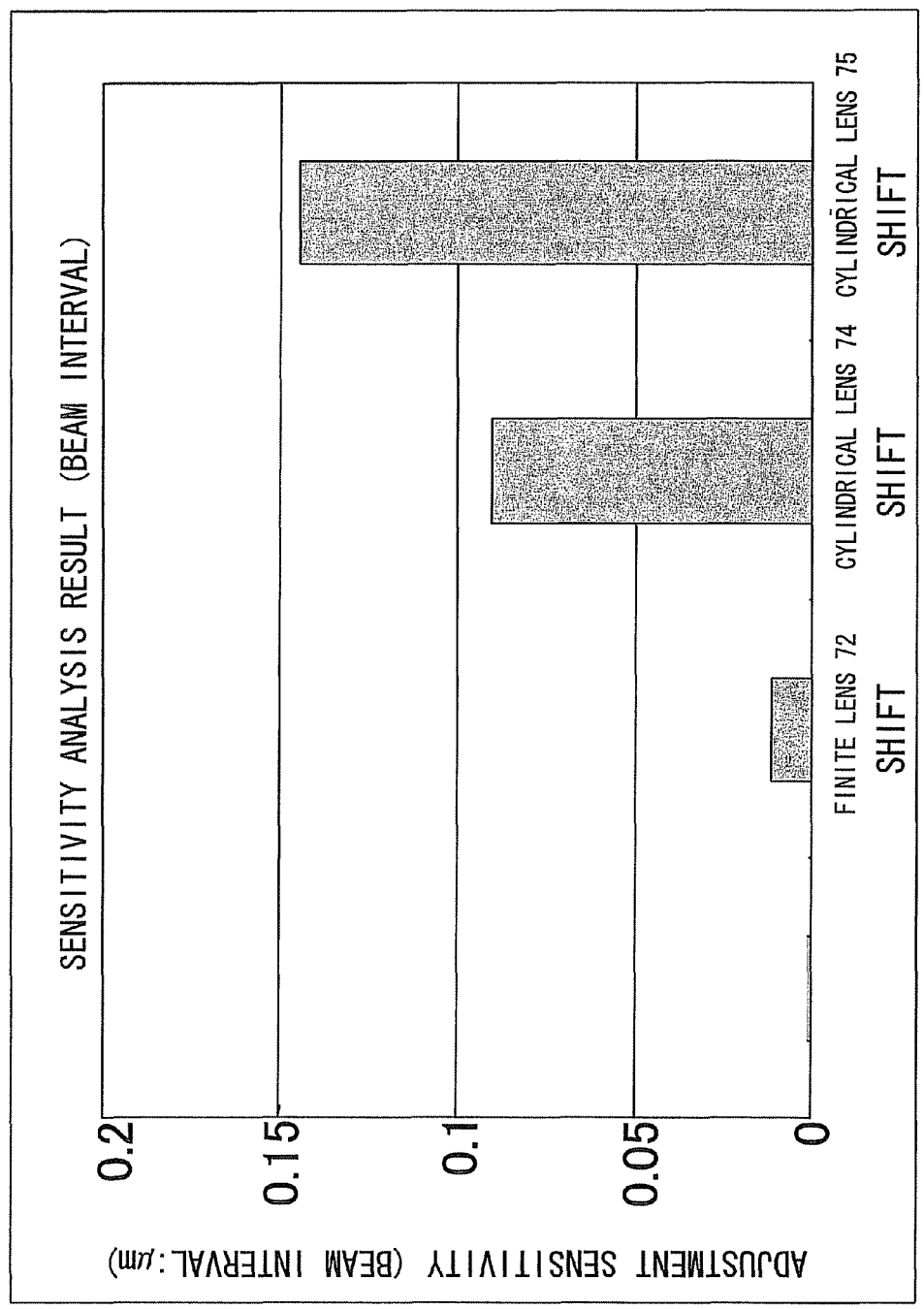
FIG. 12 is a view showing a change in beam interval of beam interval in a case where one of a finite lens 72, a cylindrical lens 74 and a cylindrical lens 75 is moved in an optical axis direction.
Figure 13:
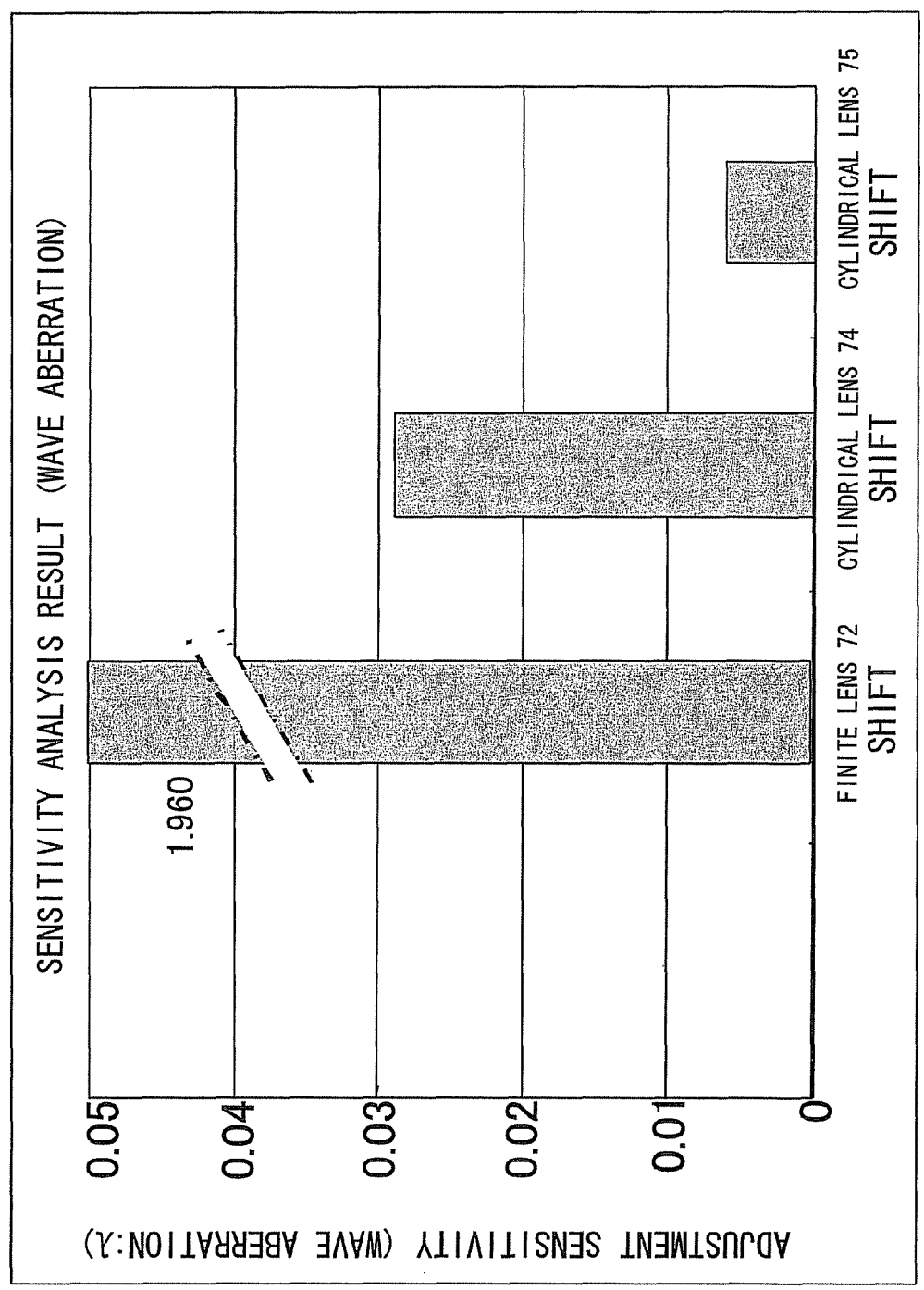
FIG. 13 is a view showing a wave aberration in a case where one of the finite lens 72, the cylindrical lens 74 and the cylindrical lens 75 is moved in the optical axis direction.

FIG. 12 is a view showing a change in beam interval in the case where one of the finite lens 72, the cylindrical lens 74 and the cylindrical lens 75 is moved in the optical axis direction by 0.5 mm, and FIG. 13 is a view showing a wave aberration in the case where one of the finite lens 72, the cylindrical lens 74 and the cylindrical lens 75 is moved in the optical axis direction by 0.5 mm.

From FIG. 12 and FIG. 13, it is understood that when the adjustment of the beam pitch is performed, it is most effective for the adjustment of the beam pitch to move the cylindrical lens 75 having the positive power, and further, a bad influence on an optical characteristic such as a wave aberration becomes smallest. Incidentally, it is conceivable that since the power of the cylindrical lens 75 is weaker than the power of the cylindrical lens 74, the wave aberration is small in the case where the cylindrical lens 75 having the positive power is moved. From the foregoing reason, in this embodiment, the cylindrical lens 75 having the positive power is moved in the light axis OR direction, and the beam pitch is adjusted.

Figure 11:
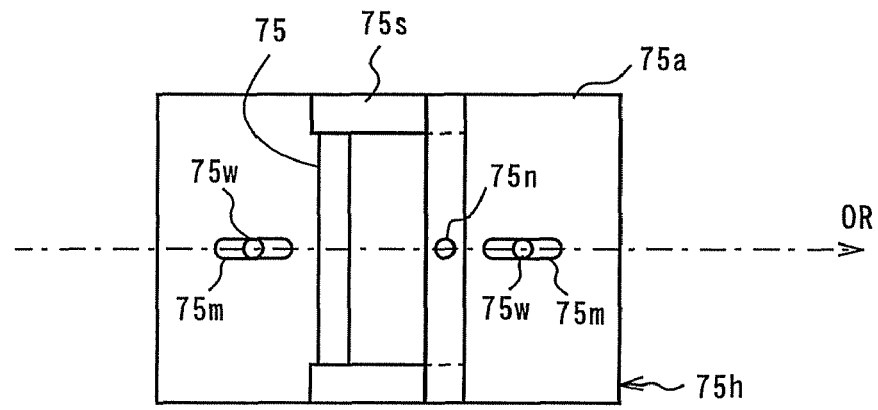
FIG. 11(A) is a view showing an example of a structure of a support part 75h.
FIG. 11(B) is a view showing the example of the structure of the support part 75h.
Figure 11:
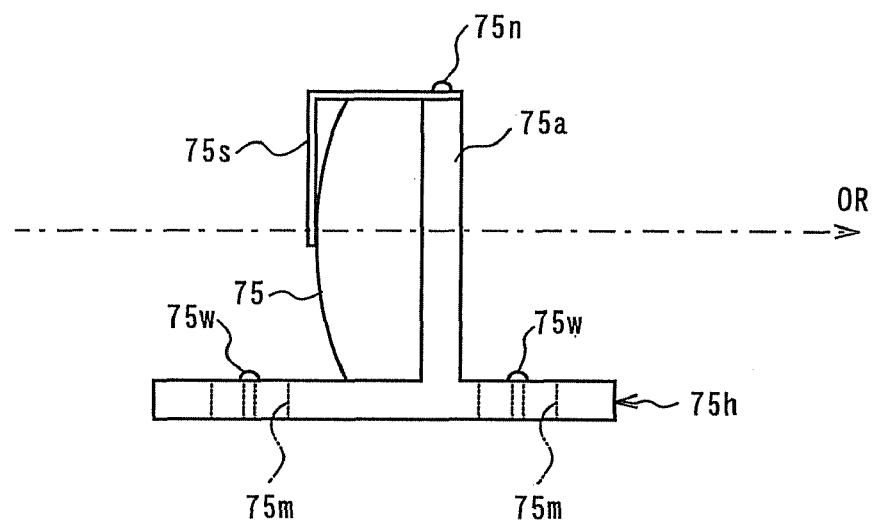
Figure 14:
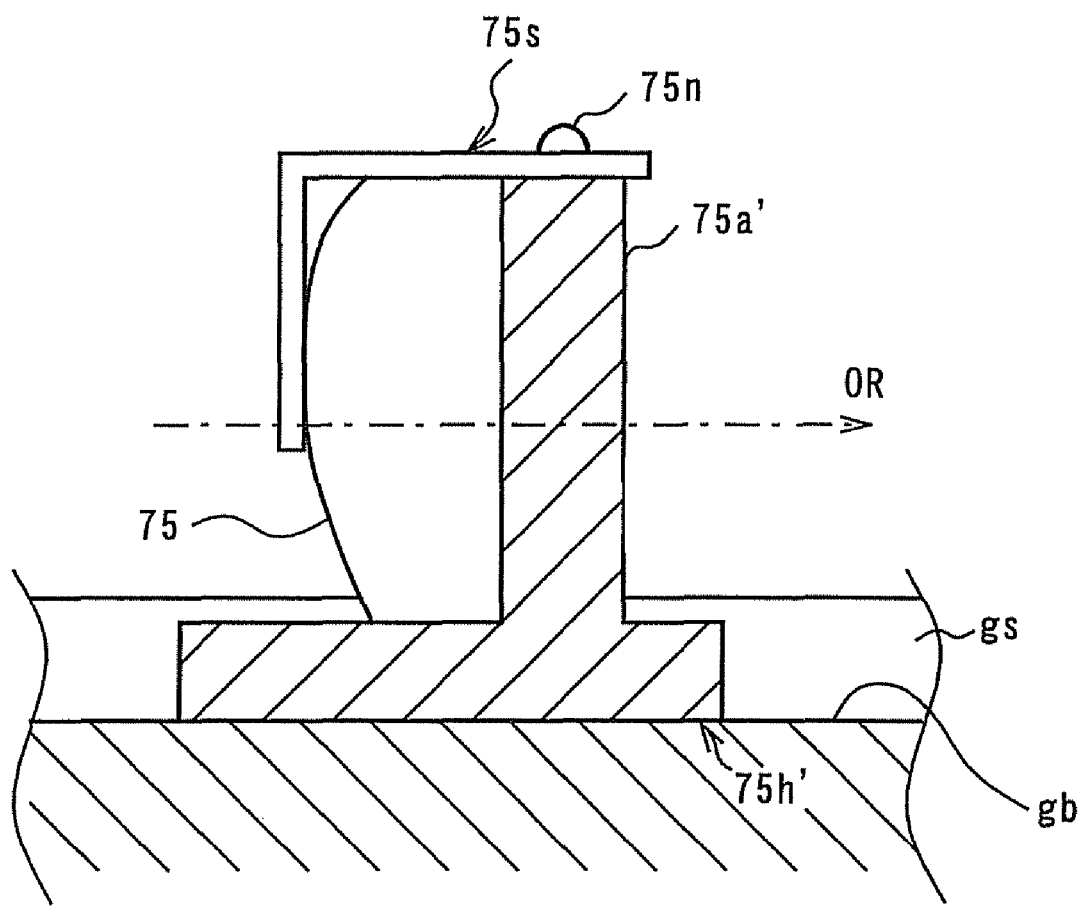
FIG. 14 is a view showing another example of a support part to support the cylindrical lens 75 movably in the optical axis direction.

FIG. 14 is a view showing another example of the support part to support the cylindrical lens 75 movably in the optical axis OR direction. In the drawing, the same portions as the portions shown in FIG. 11 are denoted by the same signs. The figure is a view in which the support part to support the cylindrical lens 75 is seen from the side. Similarly to the foregoing 75*h*, a support part 75*h'* shown in the figure presses the cylindrical lens 75 to a holder 75*a'* and supports it by a plate spring 75*s* fixed to the holder 75*a'* of aluminum by a screw 75*n*. With respect to the holder 75*a'*, both side surfaces and a bottom surface of a base portion extending from its lower part in the optical axis OR direction are guided by a guide surface gs and a guide surface gb, and it is movable in the optical axis OR direction. The holder 75*a'* is fixed to the guide surface gs and the guide surface gb at a desired position by a well-known fixing method such as screwing, bonding or pressing.

Incidentally, in the foregoing embodiment, although the structure has been described in which the second optical system having the negative power in the pre-deflection optical system is the single cylindrical lens having the negative power, limitation is not made to this, and for example, the structure can also be made such that the second optical system having the negative power is made of plural cylindrical lenses having negative power.

Figure 15:
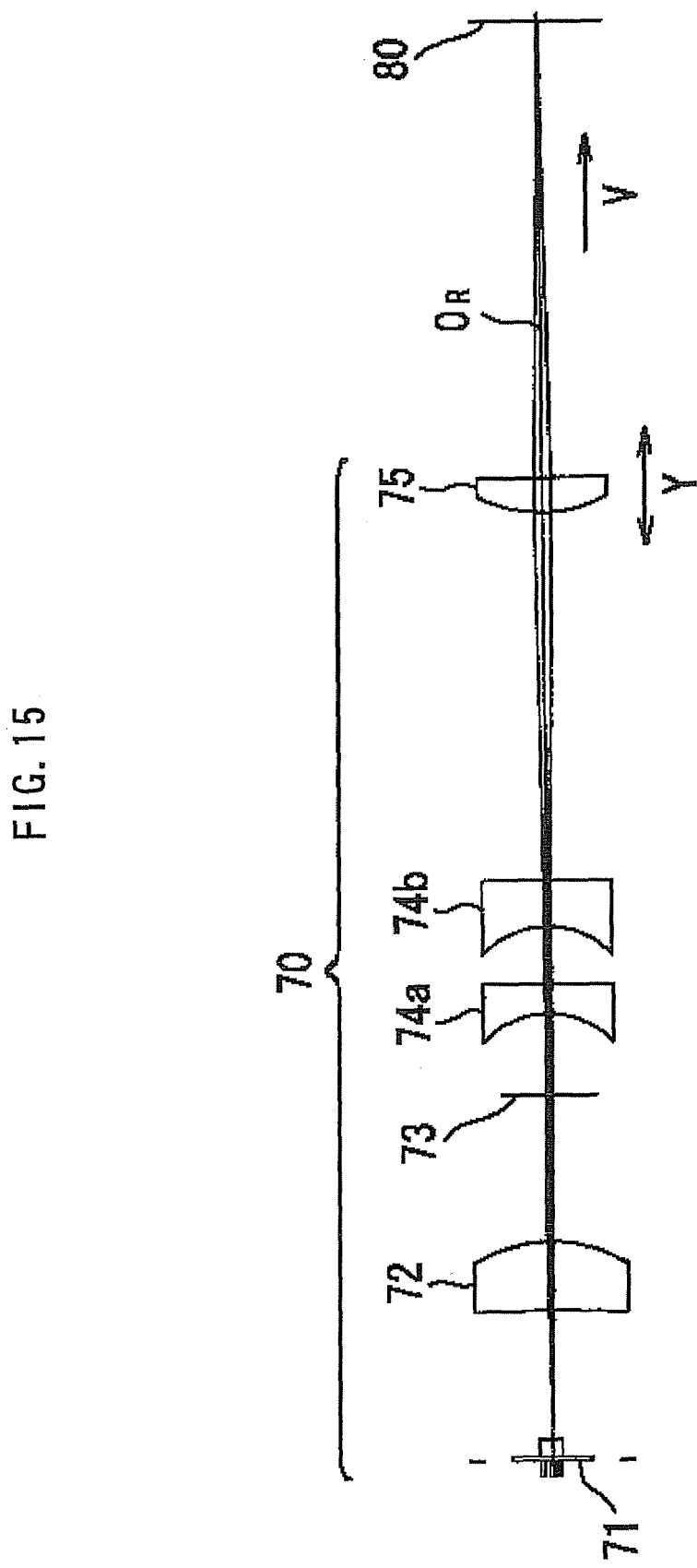
FIG. 15 is a view showing a structural example in which a cylindrical lens 74a having a negative power in a sub-scanning direction and a cylindrical lens 74b are disposed between an aperture 73 and the cylindrical lens 75.

FIG. 15 is a view showing a structural example in which a cylindrical lens 74*a* having a negative power in the sub-scanning direction and a cylindrical lens 74*b* are arranged between the aperture 73 and the cylindrical lens 75 in the structure of the pre-deflection optical system shown in FIG. 4. As stated above, when the second optical system is constructed of plural lenses having the negative power, as compared with the case where the second optical system is constructed of a single lens, the power of each lens can be made small. By this, the lens constituting the second optical system can be made to be easily processed, the improvement in processing accuracy of the lens surface can also be expected, and the second optical system can be processed at low cost and high accuracy.

As stated above, according to this embodiment, the beam interval on the image surface can be narrowed without increasing the rotation angle around the light beam traveling direction of the laser array, and it is possible to provide the optical apparatus which can prevent the optical efficiency from decreasing and the beam diameter from increasing.

Although the invention has been described in detail while using the specific mode, it would be obvious for one skilled in the art that various modifications and improvements can be made without departing from the spirit and scope of the invention.

As described above in detail, according to the invention, in the light beam scanning device adopting the multi-beam optical system, it is possible to provide a technique which can realize scanning by a light flux having a desired optical characteristic.

What is claimed is:

1. A light beam scanning device, comprising:
   plural light sources that emit light fluxes passing through positions different from each other in a sub-scanning direction;
   a first optical system that includes a lens having a negative power in the sub-scanning direction;
   a second optical system that is positioned at a more downstream side than the first optical system in a direction of light beam travel and includes a lens having a positive power in the sub-scanning direction;
   a support part that has a long hole formed to extend in parallel with an optical axis direction of the second optical system and supports the lens of the second optical system;
   a guide member that is inserted in the long hole of the support part and guides the support part to be position-adjustable in the optical axis direction; and
   a rotary deflector that deflects light emitted from the plural light sources and passed by the first and second optical systems and scans the light in a main scanning direction perpendicular to the sub-scanning direction.

2. The light beam scanning device according to claim 1, wherein the first optical system includes plural lenses having negative power.

3. The light beam scanning device according to claim 1, wherein the first optical system includes a single lens that has a negative power at an incident surface side of the light flux and has a flat surface at an outgoing surface side.

4. The light beam scanning device according to claim 1, wherein the second optical system includes a single lens that has a positive power at an incident surface side of the light flux and has a flat surface at an outgoing surface side.

5. The light beam scanning device according to claim 1, wherein the first optical system has a power higher than the second optical system.

6. The light beam scanning device according to claim 1, wherein each of lenses constituting the first and the second optical systems is a cylindrical lens.

7. The light beam scanning device according to claim 1, further comprising a third optical system that includes a single collimator lens or a finite lens, lies between the plural light sources and the first optical system, and weakens a degree of divergence or divergent light beams from the plural light sources or converts the light beams into parallel light beams or converging light beams.

8. The light beam scanning device according to claim 1, further comprising an imaging optical system that forms an image of the light flux scanned by the rotary deflector on a specified scan object, and the imaging optical system includes a plastic lens.

9. The light beam scanning device according to claim 1, wherein the lens constituting the first optical system is a glass lens.

10. An image forming apparatus, comprising:
a light beam scanning device according to any one of claims 1, 2-5 and 6-9;
a photosensitive body on which an electrostatic latent image is formed by a light flux scanned by the light beam scanning device; and
a developing part that reveals the electrostatic latent image formed on the photosensitive body.

11. A light beam scanning device, comprising:
plural light sources means for emitting light fluxes passing through positions different from each other in a sub-scanning direction;
first light flux processing means for including a lens having a negative power in the sub-scanning direction;
second light flux processing means for being positioned at a more downstream side than the first light flux processing means in a direction of light beam travel and has a lens having a positive power in the sub-scanning direction;
support means for having a long hole formed to extend in parallel with an optical axis direction of the second light flux processing means, for supporting the lens of the second light flux processing means;
guide means for being inserted in the long hole of the support means, for guiding the support means to be position-adjustable in the optical axis direction; and
light scanning means for deflecting light emitted from the plural light sources and passed by the first and second light flux processing means and scanning the light in a main scanning direction perpendicular to the sub-scanning direction.

12. The light beam scanning device according to claim 11, wherein the first second light flux processing means includes plural lenses having negative power.

13. The light beam scanning device according to claim 11, wherein the first light flux processing means includes a single lens that has a negative power at an incident surface side of the light flux and has a flat surface at an outgoing surface side.

14. The light beam scanning device according to claim 11, wherein the second light flux processing means includes a single lens that has a positive power at an incident surface side of the light flux and has a flat surface at an outgoing surface side.

15. The light beam scanning device according to claim 11, wherein the first light flux processing means has a power higher than the second light flux processing means.

16. The light beam scanning device according to claim 11, wherein each of lenses constituting the first and the second light flux processing means is a cylindrical lens.

17. The light beam scanning device according to claim 11, further comprising third light flux processing means for including a single collimator lens or a finite lens, lies between the plural light sources and the first light flux processing means, and weakens a degree of divergence of divergent light beams from the plural light sources or converts the light beams into parallel light beams or converging light beams.

18. The light beam scanning device according to claim 9, further comprising imaging means for forming an image of the light flux scanned by the light scanning means on a specified scan object, and the imaging means includes a plastic lens.

19. An image forming apparatus, comprising:
a light beam scanning device according to any, one of claims 11, 12-15 16 and 17; image bearing means on which an electrostatic latent image is formed by a light flux scanned by the light beam scanning device; and
developing means for revealing the electrostatic latent image formed on the photosensitive body.

20. An optical beam scanning method of an optical system that includes a plural light sources, a lens having a positive power in the sub-scanning direction, a support part that has a long hole formed to extend in parallel with an optical axis direction of the optical system and supports the lens of the optical system, a guide member that is inserted in the long hole of the support part and guides the support part to be position-adjustable in the optical axis direction, the method comprising:
giving, a negative power to the light fluxes emitted from the plural light sources by lens having a negative power in the sub-scanning direction;
giving a positive power to the light flux, to which the negative power has been given, by a lens that is adjusted an interval of the light fluxes emitted and passed by the optical system in the sub-scanning direction by moving the support in the optical axis direction; and
deflecting the light flux, to which the positive power has been given, by the rotary deflector and scanning it in a main scanning direction perpendicular to the sub-scanning direction.

* * * * *